United States Patent
DeMille

(10) Patent No.: US 10,955,222 B2
(45) Date of Patent: Mar. 23, 2021

(54) GARMENTS AND EQUIPMENT HAVING TEMPERATURE-INDUCED LOCKING CAMOUFLAGE PATTERNS

(71) Applicant: Gregory DeMille, Tweed (CA)

(72) Inventor: Gregory DeMille, Tweed (CA)

(*) Notice: Subject to any disclaimer, the term of this patent is extended or adjusted under 35 U.S.C. 154(b) by 166 days.

(21) Appl. No.: 14/598,545

(22) Filed: Jan. 16, 2015

(65) Prior Publication Data
US 2015/0345911 A1    Dec. 3, 2015

Related U.S. Application Data

(60) Provisional application No. 61/997,494, filed on Jun. 3, 2014.

(51) Int. Cl.
| | |
|---|---|
| *F41H 3/02* | (2006.01) |
| *A41D 13/01* | (2006.01) |
| *A41D 31/02* | (2019.01) |
| *C09D 11/50* | (2014.01) |
| *D06P 1/00* | (2006.01) |

(52) U.S. Cl.
CPC .............. *F41H 3/02* (2013.01); *A41D 13/01* (2013.01); *A41D 31/02* (2013.01); *C09D 11/50* (2013.01); *D06P 1/004* (2013.01); *Y10T 428/24802* (2015.01)

(58) Field of Classification Search
None
See application file for complete search history.

(56) References Cited

U.S. PATENT DOCUMENTS

| | | | | |
|---|---|---|---|---|
| 5,558,699 | A * | 9/1996 | Nakashima | B41M 5/305 106/31.16 |
| 8,222,183 | B2 | 7/2012 | Ono | |
| 2003/0087580 | A1* | 5/2003 | Shibahashi | A63H 33/22 446/14 |
| 2004/0241385 | A1* | 12/2004 | Huseman | A47K 3/38 428/99 |
| 2006/0182160 | A1 | 8/2006 | Watts et al. | |

(Continued)

FOREIGN PATENT DOCUMENTS

| | | |
|---|---|---|
| CA | 1240883 | 8/1988 |
| CA | 2122933 A1 | 11/1994 |

(Continued)

OTHER PUBLICATIONS

Written Opinion dated Jul. 2, 2015, issued by the Canadian Intellectual Property Office for International PCT Patent Application No. PCT/CA2015/000141.

(Continued)

*Primary Examiner* — Laura C Powers
(74) *Attorney, Agent, or Firm* — Hodgson Russ LLP

(57) ABSTRACT

Disclosed is a camouflage garment and camouflage equipment carrying a thermochromic ink composition having a first colour stale and a second colour state, wherein the first colour state switches to the second colour state at a first set temperature and the second colour state switches to the first colour state at a second set temperature. Each of the first colour state and second colour state are stable between the first set temperature and second set temperature. Also disclosed is a method for producing the camouflage garment and camouflage equipment.

11 Claims, 4 Drawing Sheets

(56) References Cited

U.S. PATENT DOCUMENTS

2008/0050540 A1* 2/2008 Christofer ................ B44F 1/06
                                                      428/13
2012/0148797 A1   6/2012 Tsai
2012/0211156 A1   8/2012 Harvey et al.

FOREIGN PATENT DOCUMENTS

| CA | 2253160 A1 | 4/1999 |
| CA | 2758223 A1 | 5/2013 |
| CN | 203019743  | 6/2013 |
| JP | 2014004795 | 1/2014 |

OTHER PUBLICATIONS

International Search Report issued by the Canadian Intellectual Property Office for International PCT Patent Application No. PCT/CA2015/000141.

* cited by examiner

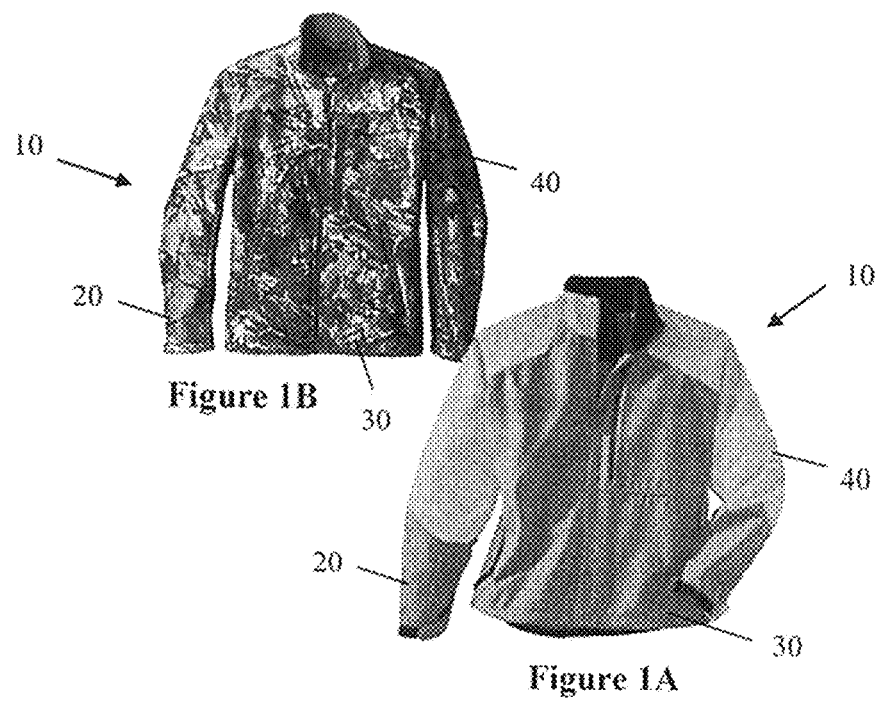
Figure 1B
Figure 1A
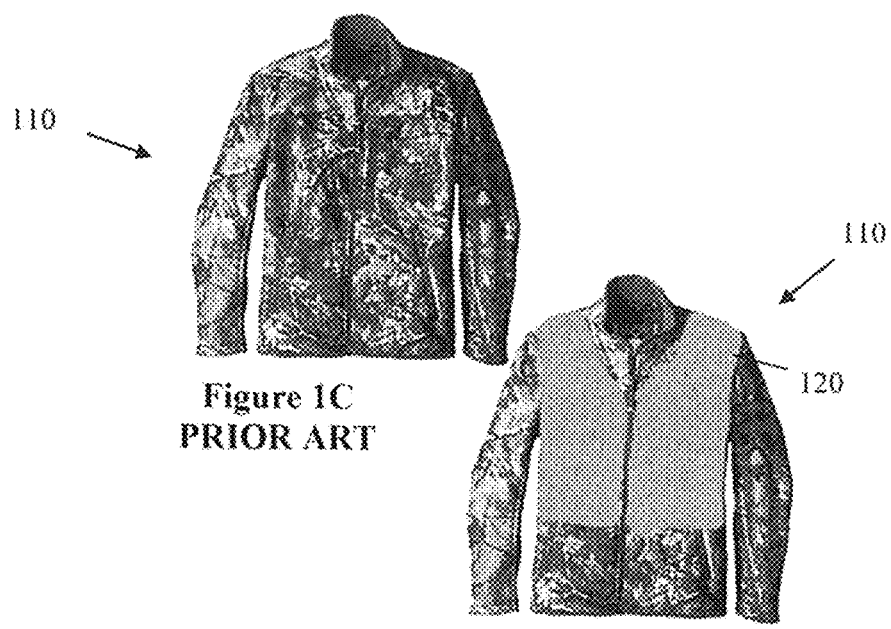
Figure 1C
PRIOR ART
Figure 1D
PRIOR ART

GARMENTS AND EQUIPMENT HAVING TEMPERATURE-INDUCED LOCKING CAMOUFLAGE PATTERNS

CROSS-REFERENCE

This application claims the benefit of U.S. Provisional Application No. 61/997,494 filed Jun. 3, 2014, the contents of which are incorporated by reference.

FIELD OF THE INVENTION

The present application relates to camouflage clothing and equipment. In particular, the present application relates to temperature-induced camouflage, patterns in clothing and equipment.

BACKGROUND

Fabrics and clothing displaying printed camouflage patterns are widely employed in hunting and other outdoor activities, sportswear, surveillance and tactical applications. Camouflage patterns are generally designed to conceal individuals, clothing, and equipment by integrating and blending their appearance with the background environment. For example, camouflage colouring for hunting may display patterns resembling leaves, trees, and other vegetation of appropriate colours which serve to render the appearance of the hunter indistinguishable from the forest environment.

Recently, camouflage garments have been disclosed which are capable of changing colour in response to variations in the ambient temperature (see e.g., Harvey et al., U.S. application Ser. No. 13/317,407). Such fabrics are printed with a temperature-sensitive ink which changes from a first colour to a second colour when the temperature of the fabric is brought to a set temperature, and reverts back to the first colour when the fabric is returned to the same set temperature.

SUMMARY

In a first aspect, provided is an apparatus for use outdoors, the apparatus comprising: a surface of material having a base colour; and at least one temperature-induced colour pattern comprising a thermochromic ink composition carried by the surface each of the at least one temperature-induced colour pattern having: a first colour state wherein a first colour is exhibited and a second colour state wherein a second colour is exhibited; wherein the first colour is colourless or is the base colour such, that the base colour is visible in the first colour state; herein the second colour is different from the base colour such that the base colour of the surface and the second colour of the al least one temperature-induced colour pattern define a camouflage appearance for the surface; wherein the first colour state is induced when the surface is brought to a first set temperature and the first colour state is maintained until the surface is brought to a second set temperature that induces the colour pattern to change to the second colour state; and wherein the second colour state is maintained until the surface is brought to the first set temperature that induces the colour pattern to change from the second colour state to the first colour state.

The apparatus may comprise a plurality of temperature-induced colour patterns. The plurality of temperature-induced colour patterns may differ hi the first set temperature, the second set temperature, or both. The base colour may be produced by non-thermochromic ink. The at least one temperature-induced colour pattern may be restricted to a portion of the surface. Bringing the surface to a first set temperature may comprise heating the surface and bringing the surface to a second set temperature may comprise cooling the surface. Heating the surface may comprise restricting application of heat to a portion of the surface comprising the at least one-temperature-induced colour pattern and cooling the surface may comprise restricting application of cold to a portion of the surface comprising the at least one temperature-induced colour pattern.

In a second aspect, provided is an apparatus for use outdoors, the apparatus comprising: a surface of material defining a base camouflage pattern; and at least one temperature-induced colour pattern comprising a thermochromic ink composition carried by the surface, each of the at least one temperature-induced colour pattern having: a first colour state wherein a first colour is exhibited and a second colour state wherein, a second colour is exhibited; wherein the first colour is coloured such that the base camouflage is not visible in the first colour state; wherein the second colour is colourless such that the base camouflage of the surface is visible in the second colour state; wherein the first colour state is induced when the surface is brought to a first set temperature and the first colour state is maintained until the surface is brought to a second set temperature that induces the colour pattern to change to the second colour state: and wherein the second colour state is maintained until the surface is brought to the first set temperature that induces the colour pattern to change to the first colour state.

The apparatus may comprise a plurality of temperature-induced colour patterns. The plurality of temperature-induced colour patterns may differ in the first set temperature, the second set temperature, or both. The base colour may be produced by non-thermochromic ink. The at least one temperature-induced colour pattern may be restricted to a portion of the surface. Bringing the surface to a first set temperature may comprise heating the surface and bringing the surface to a second set temperature may comprise cooling the surface. Heating the surface may comprise restricting application of heat to a portion of the surface comprising the at least one-temperature-induced colour pattern and cooling the surface may comprise restricting application of cold to a portion of the surface comprising the at least one temperature-induced colour pattern.

In a third aspect, provided is a method for producing an apparatus for use outdoors, the method comprising: providing a garment or equipment comprising a surface of material having a base colour; and applying to the surface at least one thermochromic ink composition having a first colour state wherein a first colour is exhibited and a second colour state wherein a second colour is exhibited: wherein the second colour is different from the base colour such that the base colour of the surface and the second colour of the at least one temperature-induced colour pattern define a camouflage appearance for the surface; wherein the first colour state is induced when the surface is brought to a first set temperature and the first colour state is maintained until the surface is brought to a second set temperature that induces the colour pattern to change to the second colour state; and wherein the second colour state is maintained until the surface is brought to the first set temperature that induces the colour pattern to change to the first colour state.

A plurality of thermochromic ink compositions may be applied. The method may be applied to a portion of the surface.

In a fourth aspect, provided is a method for producing an apparatus for use outdoors, the method comprising: providing a garment or equipment comprising a surface of material having a base camouflage pattern; and applying to the surface at least one thermochromic ink composition having a first colour state wherein a first colour is exhibited and a second colour state wherein a second colour is exhibited; wherein the first colour is coloured such that the base camouflage is not visible in the first colour state and the second colour is colourless such that the base camouflage of the surface is visible in the second colour state; wherein the first colour state is induced when the surface is brought to a first set temperature and the first colour state is maintained unlit the surface is brought to a second set temperature that induces the colour pattern to change to the second colour state; and wherein die second colour state is maintained until the surface is brought to the first temperature that induces the colour pattern to change to the first colour state.

A plurality of thermochromic ink compositions may be applied. The method may be applied to a portion of the surface.

BRIEF DESCRIPTION OF THE DRAWINGS

Embodiments of the present subject matter will be described with reference to the accompanying drawings, wherein like reference numerals denote like parts, and in which:

FIG. 1A depicts a front view of a jacket, displaying a solid colour pattern;

FIG. 1B depicts a trout view of the jacket of FIG. 1A displaying a multi-colour camouflage pattern;

FIG. 1C depicts a front view of a jacket known in the art displaying a multi-coloured camouflage pattern;

FIG. 1D depicts the jacket of FIG. 1C with a solid colour vest covering a portion of the multi-coloured camouflage pattern;

DETAILED DESCRIPTION OF THE PREFERRED EMBODIMENTS

Figure 2A:
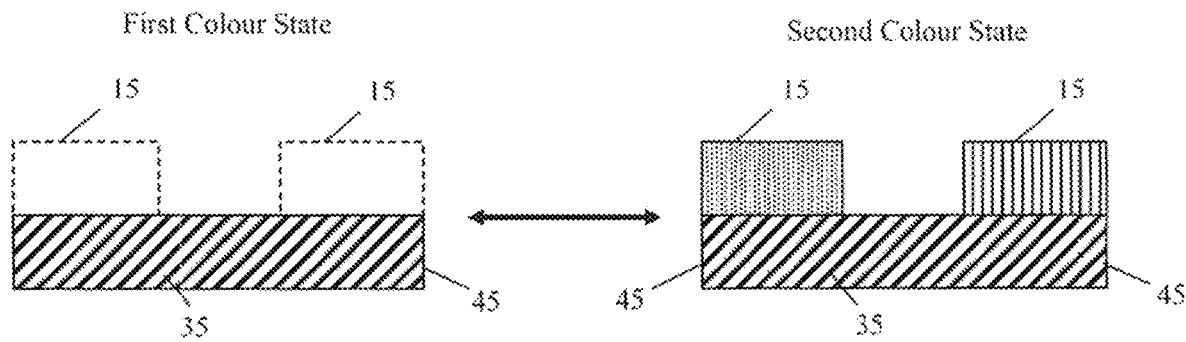
FIG. 2A is a schematic diagram showing a side view of one embodiment for inducing the camouflage pattern described herein.

Temperature-sensitive camouflage garments and equipment known in the art have several disadvantages. First, the temperature-sensitive ink changes colour at a single set temperature occurring within a range regularly experienced as an ambient temperature by users of the camouflage article (e.g. a set temperature of 10° C. to reverse between "summer" colours and "fall" colours). This means that undesired colour changes are induced when the article is subjected to unexpected changes in temperature typical of outdoor environments. Second, where a single temperature-sensitive ink is used, the entirety of the temperature-sensitive ink pattern typically occupies the same colour state. While a portion of the ink pattern may be induced to temporarily change colour by applying beat or cold locally to raise or lower the temperature past the set temperature, removal of the heat or cold from the portion of the ink pattern will lead to the temperature returning to ambient and the colour reverting to its original state. Third, users of the camouflage article are unable to account for shadowing on the surface of the article which may interfere with the desired camouflage effect. The above properties associated with known camouflage articles increase the likelihood that a user will be perceived, thus detracting from the usefulness of the camouflage and in some cases endangering a user.

A further concern with known camouflage articles is that users cannot change a multi-colour camouflage pattern to a solid colour. This would be useful, for example, to meet hunting regulations requiring garments to display solid, bright colours.

Accordingly it may be desired to provide a camouflage material that gives a user increased control over the pattern and colour of the camouflage in a variety of circumstances.

Herein the term "camouflage" refers to a colour pattern of an article of clothing or equipment, the colour pattern comprising two or more adjacent colours used for the purpose of concealment.

Referring to FIGS. 1A-B and 2A-C, shown is a garment 10 made of a fabric material having three portions 20, 30, 40. The base colour 35 of the fabric material 45 comprising portions 20, 30 is different than the base colour 35 of the fabric material 45 comprising portion 40. The surface of the fabric material 45 of garment 10 is printed with one or more locking thermochromic inks 15, each capable of changing from a first colour state to a second colour state when brought to a first set temperature. In FIG. 1A, the locking thermochromic inks 15 occupy the first colour state (e.g. colourless or transparent; see below) such that the garment 10 displays the respective base colour 35 in portions 20, 30, 40. FIG. 1B depicts the garment 10 of FIG. 1A after the surface of the garment undergoes a temperature change to the first set temperature. The change in temperature induces the locking thermochromic inks 15 to occupy respective second colour states giving rise to a combination of colours which define a multi-coloured camouflage pattern.

Following induction of the camouflage pattern displayed in FIG. 1B, the camouflage is in a fixed state, or "locked-in", until the surface of the garment 10 is brought to a second set temperature. At the second set temperature the locking thermochromic inks 15 on the surface of garment 10 switch from the second colour state to the first colour state, thereby re-generating the solid colour pattern of the garment 10 depicted in FIG. 1A. The solid colour pattern is then locked-in until the surface of garment 10 is again brought to the first set temperature.

Referring to FIGS. 1A-B and 2A, in one embodiment locking thermochromic inks 15 are colourless in a first colour state such that the base colour 35 of the fabric material 45 of portions 20, 30, 40 is visible. Typically the base colour 35 of the fabric material 45 is the natural colour of the fabric or the colour of non-thermochromic ink applied to the fabric material 45. When the surface of the garment 10 is brought to the first set temperature, the locking thermochromic inks 15 change colour from colourless to a second colour state which is coloured (e.g., brown, green). In this embodiment, typically the locking thermochromic inks 15 do not cover the entire surface of the fabric material of garment 10, resulting in at least a portion of the base colour 35 of the fabric material 45 of portions 20, 30, 40 remaining visible in the second colour state. In combination, the colours of the second colour state of the one or more locking thermochromic inks 15 and the visible portion of the base colour 35 define the multi-coloured camouflage pattern shown in FIG. 1B. When the surface of the garment 10 is brought to the second set temperature, the second colour states of the locking thermochromic inks 15 switch back to the first colour state shown in FIG. 2A and the garment 10 again assumes the colour pattern represented by the base colour 35 of the underlying fabric material 45.

In a variation (not shown) of the above embodiment, the first colour state of the locking thermochromic inks 15 is the same colour as the base colour 35 (e.g., produced by a non-thermochromic ink) of the underlying fabric material 45. Accordingly, in cases where the locking thermochromic inks 15 cover only a portion of the total surface of the fabric material 45 of the garment 10, uncovered portions of the fabric material 45 match the colour of the locking thermochromic inks 15 in the first colour state. When the surface of the garment 10 is brought to the first set temperature, each locking thermochromic ink 15 changes colour from the base colour 35 to a different colour, while the portions of the fabric material 45 not treated with locking thermochromic ink 15 exhibit the base colour 35, thereby defining the temperature-induced camouflage pattern.

Figure 2B:
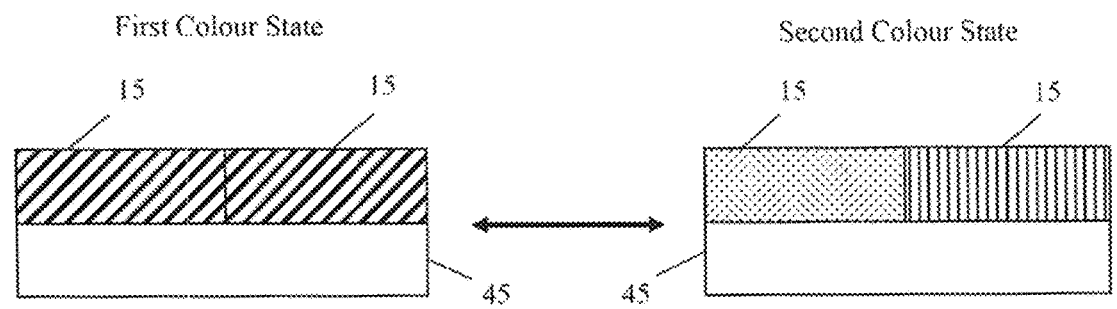
FIG. 2B is a schematic diagram showing a side view of another embodiment for inducing the camouflage pattern described herein.

Referring to FIGS. 1A-B and 2B, in a second embodiment, the surface of the fabric material 45 is completely covered by multiple locking thermochromic inks 15, and the solid colours exhibited by portions 20, 30, 40 of garment 10 in FIG. 1A are defined by the colours of each of the first colour states of locking thermochromic inks 15. In this case, each locking thermochromic ink 15 printed within portions 20, 30 of garment 10 in FIG. 1A exhibits the same colour in the first colour state and each locking thermochromic ink 15 printed within portion 40 exhibits the same colour in the first colour state. When the surface of the garment 10 is brought to the first set temperature, each locking thermochromic ink 15 printed on the surface of the fabric material 45 changes to the second colour state, which may be different for different inks within a given portion 20, 30, 40. In combination the colours of the second colour state define the camouflage pattern shown in FIG. 1B. When the surface of the garment 10 is brought to the second set temperature, the colour change of the locking thermochromic inks 15 reverses and the garment 10 again assumes the solid colour pattern corresponding to the colour of each locking thermochromic ink 15 in its first colour state.

Figure 2C:
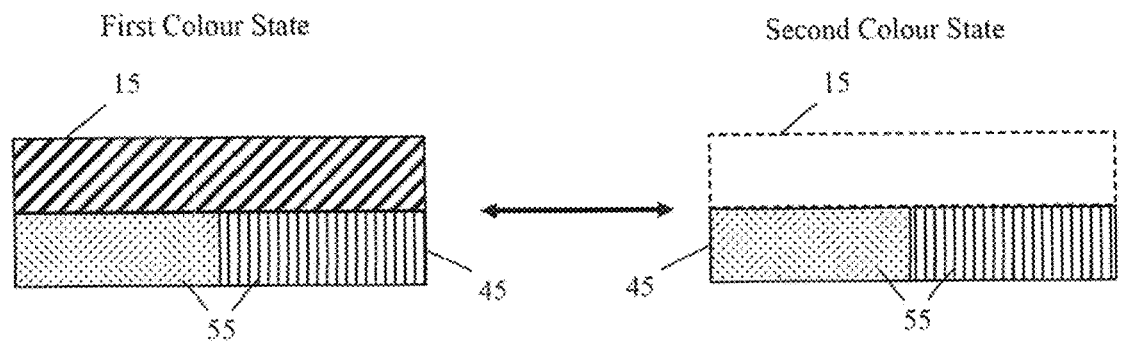
FIG. 2C is a schematic diagram showing a side view of another embodiment for inducing the camouflage pattern described herein.

Referring to FIGS. 1A-B and 2C, in a third embodiment, typically the entire surface of the fabric material 45 is covered by locking thermochromic ink 15, and the solid colours of each of portions 20, 30, 40 of garment 10 are defined by the colours of the first colour state of the locking thermochromic ink 15. When the surface of the garment 10 is brought to the first set temperature, the locking thermochromic ink 15 switches to the second colour state, which is colourless, exposing a multi-coloured base camouflage pattern 55 (e.g. printed) of the fabric material 45 underlying the locking thermochromic ink 15. Typically the multi-coloured base camouflage pattern 55 is permanent and is printed with non-thermochromic ink. Changing the temperature of the surface of the garment 10 to re-induce the first colour state of the locking thermochromic ink 15 then conceals the base camouflage pattern 55 with the solid colours. This embodiment is notable in that a single locking thermochromic ink 15 can be used to switch between a solid and multi-coloured camouflage pattern, since the locking thermochromic ink 15 per se does not contribute to the camouflage, but is used to expose and conceal the underlying non-thermochromic base camouflage pattern 55.

Figures 3A, 3B:
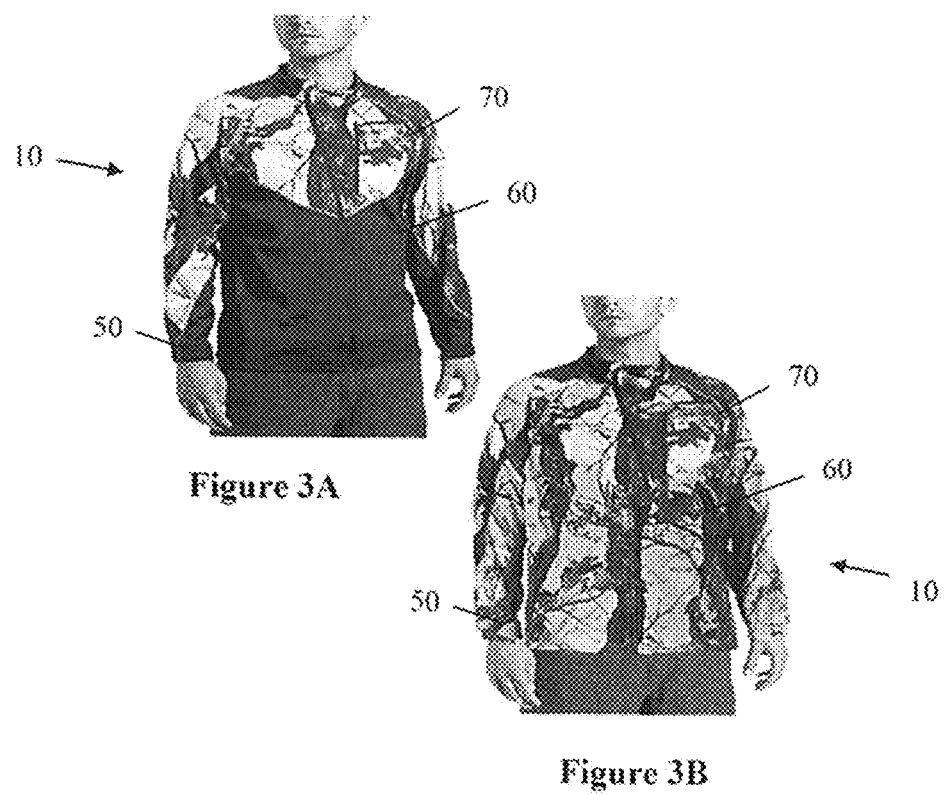
FIG. 3A depicts a front view of a jacket displaying both a multi-coloured camouflage pattern and a solid colour pattern.
FIG. 3B depicts a front view of the jacket of FIG. 3A displaying only a multi-coloured camouflage pattern.

FIGS. 3A and 3B depict a different version of the garment 10 wherein locking thermochromic ink 15 is printed on the surface of portions 50, 60 of a fabric material 45 of the garment 10 but not on portion 70 of the fabric material 45. In FIG. 3A the locking thermochromic ink 15 printed on the surface of portions 50, 60 occupies a first colour state such that portions 50, 60 present as a solid colour. For example, as described above, the locking thermochromic ink 15 of portions 50, 60 may be colourless in the first colour state such that portions 50, 60 display the base colour 35 of the underlying fabric material 45. Alternatively, the solid colours of portions 50, 60 may be the colour of the locking thermochromic ink 15 in its first colour state. In contrast, portion 70 is printed with a camouflage pattern in non-thermochromic ink. When the surface of the garment 10 is brought to a first set temperature, the locking thermochromic ink 15 carried by portions 50, 60 changes from the first colour state to the second colour state. For example, in one embodiment the locking thermochromic ink 15 changes from colourless in the first colour state to coloured in the second colour state, and the combination of colours in the second colour state (along with portions of the base colour 35, if the locking thermochromic ink 15 does not cover the entire surface of portions 50, 60) define a camouflage pattern continuous with that of portion 70. In another embodiment, the thermochromic ink 15 changes from coloured in the first colour state to colourless in the second colour state, thereby exposing a multi-coloured base camouflage pattern 55 printed on the underlying fabric material 45. Typically the base camouflage pattern 55 is printed with non-thermochromic ink. In both embodiments the uniform camouflage pattern depicted in FIG. 3B is stable until the surface of the garment 10 is brought to a second set temperature which induces the locking thermochromic ink 15 printed in portions 50, 60 to revert from the second colour state to the first colour state.

The values of the first set temperature and the second set temperature preferably have a minimum separation of 50° C. and no maximum separation. Referring again to FIGS. 1A and 1B, in one embodiment the first set temperature is higher than the second set temperature such that the garment 10 when displaying the solid colours of FIG. 1A must be heated in order to induce the camouflage pattern of FIG. 1B, and cooled to regenerate the solid colours of FIG. 1A. For example, the first set temperature may be 40° C. and the second set temperature may be −10° C., Alternatively, the first set temperature may be lower than the second set temperature such that the garment 10 must be cooled to induce the camouflage pattern of FIG. 1B, and heated to regenerate the solid colours of FIG. 1A.

It will be clear from the above description that the presently described camouflage offers an advantage over an item printed with one or more temperature-activated colour-changing inks having a single set temperature (i.e., where the change from the first colour state to the second colour state and from the second colour state to the first colour state occurs at the same temperature). Where there is only a single set temperature, it is typically set within a range of temperatures regularly encountered within the ambient environment. For example, the set temperature may be 10° C. in order to induce a change in the pattern of camouflage from summer colours (e.g., green) to fall colours (e.g., brown). However, in such a case the item is subject to alternating colour changes when used during a period when the temperature of the environment is fluctuating above and below 10° C. Further, sudden drops or increases in temperature may induce undesired colour changes.

The presently described camouflage garment and equipment are advantageous over items printed with temperature-sensitive ink having a single set temperature since the colour state is fixed over the range of temperatures between the first set temperature and the second set temperature. The set temperatures can accordingly be selected to reduce the likelihood of unexpected colour changes due to fluctuating temperatures or sudden changes in temperature. For instance, in the above example a first set temperature could be set to 4° C. to induce summer colours (e.g. light and dark shades of green) while a second set temperature could be set to −10° C. to induce fall colours (e.g. shades of brown).

In a further example, locking thermochromic ink 15 may be used to provide a garment 10 which satisfies hunting garment regulations. In some jurisdictions, hunters are required to display a bright colour (e.g. orange) on shoulder regions while hunting with a rifle. Garment colour may not be regulated where a different weapon such as a bow is used, or for non-hunting outdoor activities such as wildlife photography. Referring to FIGS. 1C and 1D, the known manner to satisfy such regulations is to wear a coloured vest 120 over a jacket 110 having a camouflage pattern printed using non-thermochromic ink. The presently described garment inherently enhances the functionality of the vest, serving the dual purpose of a rifle-hunting and bow-hunting or wildlife photography garment. In particular, FIG. 1A shows a rifle-hunting embodiment of the garment 10 with solid colours in the shoulder regions and arms, while FIG. 1B shows a second embodiment displaying a camouflage pattern.

It is contemplated that the presently described technology can be used to induce stable colour changes in a variety of garments and equipment, including but not limited to shirts, sweaters, jackets, pants, hats, footwear, bags, tents, shade canopies, tarps, blinds, rifles, bows, and hunting and fishing equipment. Such items may be used for a variety of purposes including hunting, fishing, wildlife photography, surveillance, tactical, team sports, and casual wear.

The colour and pattern of the camouflage described herein can be of any type known in the art. For example, for tactical patterns it may be based on the temperatures in a forest environment. The pattern would typically show the greens or a mixture of greens and other colours that occur in a forest environment. However, it could also be used in a desert environment when the predominant colour is brown (e.g., by heating the surface of a garment or equipment displaying solid base colours above a set temperature to change a colourless locking thermochromic ink to a brown colour matching the background patterns and colours of the desert environment). Because the colour of the locking thermochromic ink is stable above a second set temperature, even if the summer temperatures exceed the maximum temperature, the item would not undergo any further colour change until the surface is cooled to the second set temperature.

One or more locking thermochromic inks can be applied to a fabric or other material to produce the colour changes described herein. The locking thermochromic inks employed may include inks made with micro-encapsulated pigments and/or dyes. For example, the micro-encapsulated ink may comprise the flavin group of organic compounds as the basis of temperature-induced colour change. In one embodiment, the locking thermochromic ink is as described in U.S. Pat. No. 8,222,183.

In one embodiment a single locking thermochromic ink having a first set temperature and a second set temperature is applied. In other embodiments, multiple locking thermochromic inks are used which each have the same first set temperature and second set temperature. Alternatively, multiple locking thermochromic inks applied to the surface of an article may vary in the first set temperature, second set temperature, or both. For example, a first ink and second ink applied to the surface of an item may have a first set temperature of 40° C. and 50° C. respectively. The second set temperature may be −10° C. for both inks. In a first colour state, each ink may display the same colour (e.g. green) to give rise to a solid colour pattern. When the temperature of the surface is heated to 40° C., the first ink will change to a second colour state of a different colour (e.g. brown) than the second ink, which has not reached its first set temperature and has accordingly not changed colour. At this stage the colour of the second colour state of the first ink and the colour of the first colour state of the second ink may define a multi-colour camouflage pattern. If the surface is heated further to 50° C., then the second ink will change colour to its second colour state. In one embodiment the colour of the second colour state of the second ink induced at 50° C. is different than the colour of the second colour state of the first ink induced at 40° C., thereby defining a multi-colour camouflage pattern induced at 5° C. which is different than that induced at 40° C. In another embodiment, the colour of the second colour state of both inks is the same (e.g. brown), thereby causing the multi-colour camouflage pattern induced at 40° C. to convert to a solid colour at 50° C. which is different than the solid colour which existed initially (i.e., before heating to 40° C.). In both embodiments, the initial solid colour pattern can be re-induced by cooling the surface to −10° C. Therefore, in this example, the surface of a single item can be regulated to exhibit three different colour patterns, two of which show solid colours (e.g., green and brown) and one of which is a multi-colour camouflage pattern. Even more variation, is possible using locking thermochromic inks which vary in both first and second set temperatures. In further embodiments, greater than two locking thermochromic inks are used, which may or may not vary in their first temperature, second temperature, or both.

The temperature change can be triggered by the application of heat or cold, by both natural or artificial means. For example, the fabric of a garment carrying locking thermochromic ink may be heated in a clothes dryer, using a hair dryer, or by another means known to apply heat. Cooling can be accomplished by placing the fabric in a refrigerated environment, applying cold sprays (e.g. gas dynamic cold spray), or by another means known to apply cold.

Figure 4A:
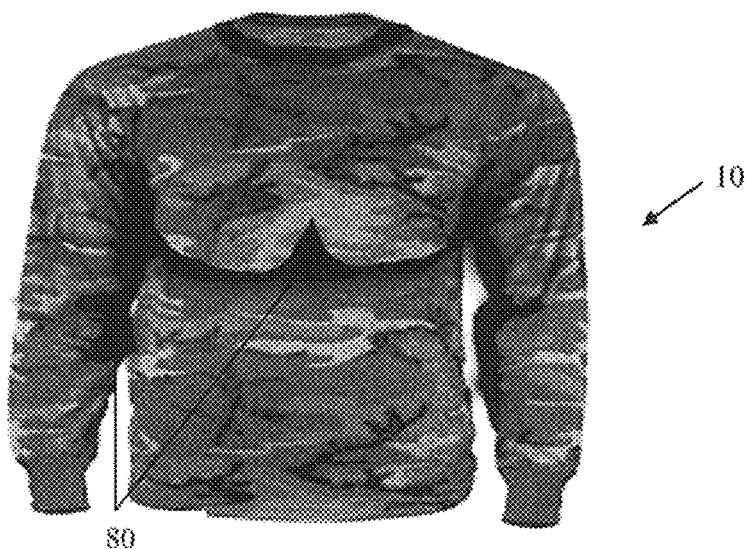
FIG. 4A depicts a front view of a multi-coloured camouflage sweater showing dark patches in commonly shadowed regions.
Figure 4B:
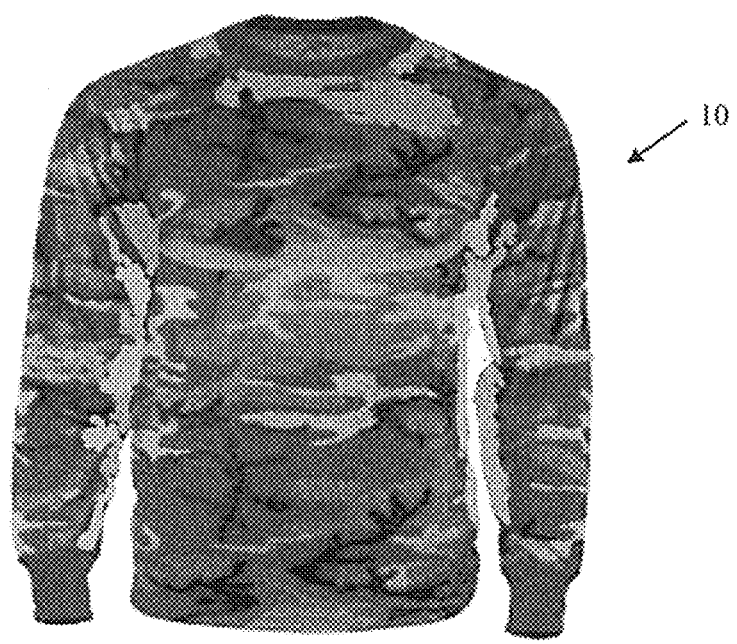
FIG. 4B depicts a front view of the sweater of FIG. 4A with the dark patches lightened.

In another embodiment, colour changes between a first colour state and second colour state can be restricted to a portion of the surface of a garment or equipment. FIG. 4A shows a garment 10 having a mufti-coloured camouflage pattern. Regions of the garment 10 which are frequently shadowed (e.g. chest and underarm regions) when the garment 10 is worn are depicted as dark patches 80. When the camouflage garment 10 is worn in daylight (e.g. for hunting purposes), such shadows can be perceived by an animal or person and thereby increase the likelihood that the wearer will be seen. FIG. 4B shows the same garment 10 without dark patches 80 due to colour changes induced locally at the regions of the garment prone to shadowing. For example, these regions of the garment may be printed with locking thermochromic ink 15 which has a first colour state that is a dark shade of green and a second colour state that is a lighter shade of green. During the daytime when shadows are likely to be perceived, the second colour state can be induced (e.g., by applying heat locally to these regions) to lighten shadow-prone areas relative to surrounding portions of the garment 10 thereby reducing or eliminating the dark patches 80. During darkness when shadows may be desired, the second colour state can be re-induced (e.g. by applying cold locally) in regions prone to shadowing.

While the subject matter described herein has been described with reference to illustrative embodiments and examples, the description is not intended to be construed in a limiting sense. Thus, various modifications of the illustrative embodiments, as well as other embodiments of the subject matter, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A method for using an apparatus outdoors, the method comprising:
    providing a garment or equipment comprising a surface of material having a base camouflage pattern and at least one thermochromic ink composition applied to the surface, the at least one thermochromic ink composition having a first colour state wherein a first colour is exhibited and a second colour state wherein a second colour is exhibited, wherein the first colour is coloured such that the base camouflage pattern is not visible in the first colour state and the second colour is colourless such that the base camouflage pattern of the surface is visible in the second colour state, wherein the first colour state is induced when the surface is brought to a first set temperature and the first colour state is fixed until the surface is brought to a second set temperature that induces the at least one thermochromic ink composition to change to the second colour state;
    heating the surface from an ambient temperature to the first set temperature with a heat source to induce a colour change from the second colour state to the first colour state; and
    cooling the surface from the ambient temperature to the second set temperature with a refrigeration source to induce a colour change from the first colour state to the second colour state, wherein the first set temperature and the second set temperature are separated by at least 50° C.;
    wherein the second colour state is fixed until the surface is heated with the heat source to the first temperature that induces the at least one thermochromic ink composition to change to the first colour state.

2. The method of claim 1 wherein the apparatus is a garment.

3. The method of claim 2 wherein the first colour state is induced locally at regions of the garment prone to shadowing.

4. The method of claim 1 wherein the apparatus is hunting or fishing equipment.

5. The method of claim 1 wherein the surface includes two or more of the at least one thermochromic ink compositions including a first thermochromic composition and a second thermochromic composition, wherein a first set temperature of the first thermochromic composition is different from a first set temperature of the second thermochromic composition, or a second set temperature of the first thermochromic composition is different from a second set temperature of the second thermochromic composition.

6. The method of claim 5 wherein the first thermochromic composition and second thermochromic composition are located on different portions of the surface.

7. The method of claim 1, wherein cooling the surface with the refrigeration source includes cooling a portion of the surface that is prone to shadowing during outdoor use such that the portion of the surface is in the second coulour state and a remainder of the surface is in the first colour state during the outdoor use.

8. The method of claim 5 wherein each of the two or more of the at least one thermochromic ink compositions define a different colour pattern.

9. The method of claim 8 wherein each of the different colour patterns are located on a different portion of the surface.

10. The method of claim 9 wherein each of the different colour patterns have a different first set temperature, a different second set temperature or both a different first set temperature and different second set temperature from others of the multiple individual patterns and each of the multiple individual patterns have a different first colour from others of the different colour patterns.

11. The method of claim 1 wherein the apparatus is equipment.

* * * * *